United States Patent
Kester et al.

(10) Patent No.: US 7,419,693 B2
(45) Date of Patent: Sep. 2, 2008

(54) COMPOSITIONS CONTAINING GREEN TEA CATECHINS AND ONE OR MORE POLYVALENT MINERAL CATIONS

(75) Inventors: Jeffrey John Kester, West Chester, OH (US); Ashok Premchand Luhadiya, Cincinnati, OH (US); Gerhard Norbert Zehentbauer, Okeana, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 664 days.

(21) Appl. No.: 10/883,446

(22) Filed: Jul. 1, 2004

(65) Prior Publication Data

US 2005/0003068 A1 Jan. 6, 2005

Related U.S. Application Data

(60) Provisional application No. 60/484,790, filed on Jul. 3, 2003.

(51) Int. Cl.
*A23F 3/00* (2006.01)
(52) U.S. Cl. .......................... 426/597; 426/435; 426/74
(58) Field of Classification Search .................. 426/597, 426/74
See application file for complete search history.

(56) References Cited

U.S. PATENT DOCUMENTS

| | | | |
|---|---|---|---|
| 4,935,256 A | 6/1990 | Tsai | |
| 4,946,701 A | 8/1990 | Tsai et al. | |
| 5,427,806 A | 6/1995 | Ekanayake et al. | |
| 5,464,619 A | 11/1995 | Kuznicki et al. | |
| 5,681,569 A | 10/1997 | Kuznicki et al. | |
| 5,780,086 A | 7/1998 | Kirksey et al. | |
| 5,827,560 A * | 10/1998 | Fu et al. | 426/435 |
| 5,879,733 A | 3/1999 | Ekanayake et al. | |
| 6,063,428 A | 5/2000 | Ekanayake et al. | |
| 6,268,009 B1 | 7/2001 | Ekanayake et al. | |
| 2003/0077374 A1 * | 4/2003 | Ohishi et al. | 426/597 |

FOREIGN PATENT DOCUMENTS

| | | | |
|---|---|---|---|
| GB | 860240 | | 2/1961 |
| JP | 63-160567 | * | 4/1988 |
| JP | 03-228667 A | | 10/1991 |
| JP | 03-290151 A | | 12/1991 |
| WO | WO 95/18540 | | 7/1995 |

OTHER PUBLICATIONS

United States Code of Federal Regulations, Title 21, Section 101.9, "Nutrition Labeling of Food".
Finger, A., et al.; "Chromatography of Tea Constituents", Journal of Chromatogr., 1992, 624; pp. 293-315.
Ashurt, P.R., "The Chemistry and Technology of Soft Drinks and Fruit Juices" CRC Press, 1998, Chapters 2-4, pp. 17-102.

* cited by examiner

*Primary Examiner*—Anthony Weier
(74) *Attorney, Agent, or Firm*—Adam W. Borgman; Roddy Bullock; Carl Roof

(57) ABSTRACT

Included are beverage compositions containing green tea catechins and polyvalent mineral cations, wherein the beverage compositions exhibit a relatively low turbidity. Also included is a process for avoiding the turbidity issues associated with inclusion of calcium and green tea catechins.

20 Claims, No Drawings

COMPOSITIONS CONTAINING GREEN TEA CATECHINS AND ONE OR MORE POLYVALENT MINERAL CATIONS

CROSS REFERENCE TO RELATED APPLICATIONS

This application claims the benefit of priority to U.S. Provisional Application Ser. No. 60/484,790, filed Jul. 3, 2003, which is herein incorporated by reference.

FIELD OF INVENTION

The present invention relates to compositions containing green tea catechins and one or more polyvalent mineral cations. Such compositions include ready-to-drink (RTD) beverages, as well as powders and concentrates that are combined with an aqueous liquid to form a consumable beverage.

BACKGROUND

Consumption of tea, particularly green tea, has increasingly been associated with therapeutic benefits in the areas of cardiovascular health and cancer prevention. These and other health benefits have been attributed to the unoxidized flavanols in green tea, i.e. the catechin monomers. As a result of these health benefits, there has been a substantial increase in the number of entrants of tea containing beverages into the ready-to-drink beverage market. Currently, many tea containing beverages are sold in the form of bottled, canned or carton-boxed products. Many of the beverages contain black tea extract with fruit juice, fruit aroma or fruit flavors, while others contain only tea flavors. When black tea is used in beverages, many of the published health benefits of the unoxidized flavanols (green tea catechins) are not realized by the consumer because black tea contains oxidized, polymerized flavanols. While certain beverage products contain green tea extract, these beverages generally contain a relatively low level of the beneficial catechins and typically do not contain a significant level of polyvalent mineral cations. The beverages also typically have a brown color or contain natural or artificial colorants to mask the brown color, or the beverages have a turbid appearance. There are not any green tea-containing beverages currently on the market that possess the combination of a relatively high level of catechins, one or more polyvalent mineral cations, and a relatively high degree of clarity (i.e. low turbidity). Therefore, there is a need for such green tea-containing beverages.

It is an object of this invention to provide compositions that contain significant levels of green tea catechins and one or more polyvalent mineral cations, wherein such compositions, when prepared in a final beverage form, are relatively clear. In one particular embodiment, the final beverage has a low level of brown color such that the appearance of the beverage is not typical of tea, but rather is similar to water.

SUMMARY OF THE INVENTION

In one aspect, the present invention relates to a fortified ready-to-drink (RTD) beverage composition comprising (1) at least about 100 ppm green tea catechins; and (2) at least about 10% of the U.S. Reference Daily Intake (RDI) of one or more polyvalent mineral cations per 250 mL of the composition; wherein the composition exhibits a turbidity of not more than about 150 Nephelometric Turbidity Units (NTU).

In another aspect, the invention relates to a liquid concentrate or dry beverage composition that exhibits the above characteristics upon dilution with the appropriate amount of aqueous liquid (e.g. water) to provide a consumable beverage.

DETAILED DESCRIPTION OF THE INVENTION

A. Definitions

As used herein, the term "botanical flavor" or "botanical extract" refers to flavors derived from parts of the plant other than the fruit. As such, botanical flavors can include those flavors derived from nuts, bark, roots and leaves. Also included within this term are synthetically prepared flavors made to simulate botanical flavors derived from natural sources. Examples of botanical flavors include hibiscus, marigold, chrysanthemum and the like. Botanical flavors can also be synthetically prepared.

As used herein, the term "caloric content" refers to the total energy in kilocalories (kcal) per serving of consumable beverage (250 mL) derived from the carbohydrate, protein, and lipid components of the beverage. Caloric content is calculated using the general factors of 4, 4, and 9 kcal per gram for the total level of carbohydrate, protein, and lipid, respectively (United States Code of Federal Regulations, Title 21, Section 101.9, *Nutrition Labeling of Food*).

As used herein, the term "comprising" means various components can be conjointly employed in the beverages of this invention. Accordingly, the terms "consisting essentially of" and "consisting of" are embodied in the term comprising.

As used herein, the terms "concentrated liquid composition" and "concentrate" mean a liquid composition of the present invention that is intended to be diluted with an aqueous liquid, such as water, prior to consumption as a beverage. The skilled artisan will recognize that the concentration of such compositions will be dictated by the components contained therein and their relative stability in an aqueous state. The concentrates of the present invention are reconstituted with an aqueous liquid, such as water, to provide a consumable beverage as described herein.

As used herein, the term "consumable beverage" and "final beverage" are used interchangeably and refer to a beverage that is prepared (e.g., diluted) in accordance with relevant package labeling. Thus, as discussed below, a ready-to-drink beverage is one that is sold such that it is consumed without additional preparation by the consumer. In contrast, dry beverage compositions and concentrates are intended to be diluted to provide a consumable beverage.

As used herein, the term "dry beverage composition" means a flowable particulate compositions that is substantially free of moisture (e.g. a powder). Typically, such compositions will contain not more than about 6% by weight total moisture. The dry beverage compositions of the present invention are reconstituted with an aqueous liquid, such as water, to provide a consumable beverage as described herein.

As used herein, the term "juice" means whole, concentrated or diluted juice from fruits and vegetables and other produce which are squeezed or crushed to supply a beverage. Juice also refers to citrus and non-citrus juices including vegetable juices.

As used herein the term "fruit flavors" refers to those flavors derived from the edible reproductive part of the seed plant, especially one having a sweet pulp associated with the seed, for example, apples, oranges, lemon, limes, etc. Also included within the term fruit flavor are synthetically prepared flavors made to simulate fruit flavors derived from natural sources.

As used herein, the term "green tea catechins" refers to the total content in parts per million (ppm) (or mg/L or µg/mL) of the following five catechins derived from green tea: epicatechin (EC), epigallocatechin (EGC), epigallocatechin gallate (EGCG), gallocatechin gallate (GCG), and epicatechin gallate (ECG).

As used herein, the term "nutritionally-supplemental amount" is meant that the mineral (and any optional vitamin) sources used in the practice of this invention provide a nourishing amount of minerals and vitamins. This supplemental amount will provide from about 5% to about 150% of the U.S. Reference Daily Intake (RDI). The RDI for vitamins and minerals is as defined in the United States of America (United States Code of Federal Regulations, Title 21, Section 101.9, *Nutrition Labeling of Food*).

As used herein, the term "polyvalent mineral cation" refers to one or more minerals that typically exist in solution in the form of positively charged cations with a net charge of +2 or greater. Non-limiting examples of polyvalent mineral cations include calcium ($Ca^{2+}$), magnesium ($Mg^{2+}$), manganese ($Mn^{2+}$), zinc ($Zn^{2+}$), and iron ($Fe^{2+}$, $Fe^{3+}$).

As used herein, "ready-to-drink" (or "RTD") and "ready-to-serve" are used interchangeably and refer to compositions of the present invention that are at their recommended drink strength and, therefore, are ready for consumption without the need for reconstitution or dilution with aqueous liquids.

As used herein "single strength" refers to recommended drink strength, i.e. the recommended concentration of the given beverage composition.

As used herein the term "shelf stable" refers to packaged beverages that do not require refrigeration while stored at ambient temperatures for prolonged periods (e.g. more than 10 days).

As used herein, the term "solids" refers to the solid materials extracted from the tea solutions which are soluble in water. The solids include caffeine, flavanols, amino acids (especially theanine), carbohydrates, edible acids, buffering salts, proteins and related materials.

As used herein, the term "total insoluble calcium component" refers to the aggregate of the moieties of a sample that bind to calcium under the conditions described in the Analytical Methods section below (Measurement of the Total Insoluble Calcium Components) and thereby become insoluble in the sample.

As used herein, the term "vitamin C" refers to L-ascorbic acid. The term "erythorbic acid" refers to its isomer, D-isoascorbic acid.

As used herein, the term "water" includes any of tap, filtered, purified, deionized, demineralized, distilled, spring, mineral, artesian, softened, sparkling, or carbonated water.

All percentages are by weight unless otherwise indicated.

B. Compositions

All concentration limits of components provided herein are based on single strength beverages, unless otherwise stated.

As mentioned, the invention relates to RTD beverages, as well as concentrated liquids and dry beverage compositions that exhibit the above characteristics upon dilution with the appropriate amount of aqueous liquid to provide a consumable beverage. Thus, in the case of dry or concentrate compositions, it will be recognized that the levels described presume that the dry or concentrate composition is diluted to provide a consumable beverage. That is, where catechin, polyvalent cation, turbidity, etc. levels are stated with respect to a dry or concentrate composition, those levels refer to the composition after it is appropriately diluted to provide a consumable beverage.

The compositions of the present invention comprise a significant level of green tea catechins, which are known to be associated with various health benefits. Some of these health benefits include cancer prevention, improved cardiovascular health, and reduced blood pressure. The compositions of the present invention comprise at least about 100 ppm of green tea catechins. (Again, for compositions that are intended to be diluted prior to consumption, the level of catechins stated herein assumes dilution as appropriate for such consumable beverage.) In one aspect, the beverage composition will comprise at least about 150 ppm green tea catechins. In another aspect, the beverage composition will comprise at least about 200 ppm green tea catechins. Preferably, the beverage composition will comprise at least about 300 ppm green tea catechins, and most preferably at least about 400 ppm green tea catechins. Typically, the beverage composition will comprise from about 100 to about 3,000 ppm green tea catechins.

The beverage compositions of the present invention have a relatively high level of clarity (i.e. low turbidity). In this regard, the compositions (in final, consumable form) will exhibit a turbidity of not more than about 150 NTU. In another aspect, the compositions will typically exhibit a turbidity of not more than about 125 NTU, more typically not more than about 100 NTU. Preferred beverage compositions of the present invention will exhibit a turbidity of not more than about 50 NTU, even more preferably not more than about 30 NTU. Typically, the beverage compositions will exhibit a turbidity of from about 1 to about 150 NTU. Turbidity of the consumable beverages is measured with a laboratory turbidimeter as described in the Analytical Methods section.

The finished beverage compositions will comprise, on a 250 mL serving basis, at least about 10% of the RDI of one or more polyvalent mineral cations. While the polyvalent mineral cation(s) may be selected from a wide range of materials, the following provides a non-exhaustive list of preferred cations. Preferred polyvalent mineral cations may be selected from calcium, magnesium, manganese, zinc, and/or iron (di- or trivalent), or mixtures thereof. The RDI values for these minerals are as follows (United States Code of Federal Regulations, Title 21, Section 101.9, *Nutrition Labeling of Food*): calcium, 1000 mg; magnesium, 400 mg; manganese, 2 mg; zinc, 15 mg; and iron, 18 mg. Suitable sources of these minerals include, but are not limited to, the following salts: citrate, sulfate, gluconate, lactate, bis-glycinate, amino acid chelates, carbonate, oxide, hydroxide, chloride, phosphate, pyrophosphate, acetate, fumarate, and malate. Preferred sources of calcium are calcium citrate malate, calcium gluconate, calcium lactate, and calcium lactate gluconate. Preferred sources of magnesium are magnesium sulfate and magnesium gluconate. A preferred source of zinc is zinc gluconate. A preferred source of iron is the amino acid chelate iron bis-glycinate, available as Ferrochel® from Albion Laboratories, Inc., Clearfield, Utah. Another preferred source of iron is ferrous gluconate. Optionally, other minerals can be added to the beverage compositions of the present invention, including phosphorus, iodine, selenium, copper, fluoride, chromium, molybdenum, sodium, potassium, and chloride. In one aspect, the compositions will comprise, on a 250 mL serving basis, at least about 15% of the RDI of one or more polyvalent mineral cations. In yet another aspect, the compositions will comprise, on a 250 mL serving basis, at least about 20% of the RDI of one or more polyvalent mineral cations. Typically, the compositions will comprise, on a 250 mL serving basis, from about 10% to about 150% of the RDI of one or more polyvalent mineral cations. Of course, the dry and concentrate compositions of the present invention will have mineral levels such that they provide the above described ranges upon appropriate dilution to provide a consumable beverage.

The compositions will preferably have, when in final form for consumption, a pH of from about 2 to about 6.5. In one aspect, the consumable beverage will have a pH of from about 2.5 to about 5, more preferably from about 3 to about 4.5. A pH within the most preferred range of from about 3 to about 4.5 is particularly desirable for minimizing dark color in a consumable beverage that does not have added coloring agents. For example, applicants surprisingly discovered that, even when iron is not part of the formulation, green tea and mineral fortified water beverages are characterized by significantly less brown color when the pH is within the most preferred range. When iron is one of the fortifying polyvalent mineral cations in the beverage formulation, low pH is especially important for minimizing the interaction between the iron cation and green tea polyphenol components, which yields significant darkening of the beverage at higher pH.

The compositions of the present invention will preferably exhibit low brown color, which is important to the ultimate consumer. Brown color is characterized by measuring absorbance of the consumable beverage at 430 nm as described in the Analytical Methods section. (Again, it will be recognized that the absorbance at 430 nm is measured using the consumable beverage. Thus, for compositions that are intended to be diluted prior to consumption, the absorbance characteristics stated herein assume dilution as appropriate for such consumable beverage.) Absorbance at 430 nm reflects the degree of brownish color in the beverage that can be caused by the presence of theaflavins, thearubigins, proteins, chlorophylls, and their degradation products. In one aspect, the beverage compositions will preferably have an absorbance at 430 nm of not more than about 0.15. In another aspect, the beverage compositions will have an absorbance at 430 mm of not more than about 0.12. In yet another aspect, the beverage compositions will have an absorbance at 430 nm of not more than about 0.10. Preferably, the beverage compositions will have an absorbance at 430 nm of not more than about 0.08, most preferably not more than about 0.05. Typically, the beverage compositions will have an absorbance at 430 nm of from about 0.01 to about 0.15.

It will be recognized that in addition to preferably being low in brown color, by virtue of low absorbance at 430 nm, the beverages of the present invention will also preferably be low in color in general. As absorbance at 430 nm of the finished beverage decreases, appearance of the beverage becomes more similar to water and eventually the appearance becomes almost indistinguishable from water. This is particularly true when the beverage is packaged in a green colored glass or plastic bottle, as is often the case for premium bottled waters (e.g. Perrier®).

Applicants have discovered that undesired solubility issues associated with inclusion of calcium (often a preferred nutrient in fortified beverages) in the present beverage compositions can be addressed by limiting the level of total insoluble calcium components, including oxalic acid, prior to calcium addition. As such, compositions of the present invention that include calcium will preferably contain not more than about 35 ppm oxalic acid or salts thereof. More typically, the compositions will contain not more than about 20 ppm, still more typically not more than about 7 ppm, oxalic acid or salts thereof. In addition, when calcium is present in the beverage composition, the composition will preferably contain not more than about 1000 ppm of total insoluble calcium components including oxalic acid. More typically, the compositions will contain not more than about 450 ppm, still more typically not more than about 250 ppm, total insoluble calcium components including oxalic acid. A preferred process for removing total insoluble calcium components, including oxalic acid, to avoid solubility issues is described below.

In a preferred process, tea extract is treated with a soluble calcium source to remove insoluble calcium components without affecting the level of catechins. The treatment is typically carried out at ambient or higher temperatures, preferably at temperatures greater than about 130° F. (54° C.). More typically, the reaction temperature is greater than about 145° F. (63° C.), still more typically the reaction temperature is greater than about 160° F. (71° C.). The reaction time is typically about 2 hours or less. More typically the reaction time is about 45 minutes or less; still more typically the reaction time is about 15 minutes or less. The preferred calcium salts to promote precipitation of the calcium insoluble components are calcium sulfate, calcium chloride, calcium acetate and calcium gluconate. Other sources of soluble calcium can also be used. The preferred pH during the treatment is less than or equal to about 7. The concentration of soluble calcium added to the tea extract to promote precipitation of the calcium insoluble components may vary from about 400 mg to about 10,000 mg per 100 gm of tea extract on a dry weight basis. For conventional green tea extracts, e.g. green tea powdered extract #285060 commercially available from Plantextrakt, Inc. (Parsippany, N.J.), the amount of calcium required tends to be toward the upper limit of this range of addition. For nano-filtered tea extract, e.g. Green Power SynerTea™ brand of green tea extract (commercially available from Amax NutraSource, Inc., Eugene, Oreg.), the amount of calcium required tends to be toward the lower limit of this range of addition. This is because the nanofiltration process used during manufacture of the SynerTea™ brand of green tea extract removes a portion of the higher molecular weight calcium insoluble components, such as pectin. After treatment to precipitate the calcium insoluble components, the tea extract is filtered to remove the insoluble/suspended material. The preferred level of insoluble calcium components in the treated green tea extract, on a dry weight basis, is not more than about 1% w/w. More typically, the level of insoluble calcium components is not more than about 0.6% w/w; still more typically the level is not more than about 0.1% w/w.

In a related aspect, applicants have surprisingly discovered that the solubility issues associated with calcium addition are not encountered with other polyvalent mineral cations. As such, it surprisingly does not appear that additional processing of the green tea (i.e., to reduce oxalic acid/pectin levels) is necessary when soluble polyvalent mineral cations other than calcium are included in the present compositions.

The beverage compositions of the present invention will preferably have a relatively low caloric content. In one preferred aspect of the invention, the compositions will have a caloric content, on a 250 mL serving basis, of not more than about 60 kilocalories (kcal). In another aspect, the compositions will typically have a caloric content, on a 250 mL serving basis, of not more than about 30 kcal, preferably not more than about 15 kcal. In a similar regard, the beverage compositions will preferably have a relatively low carbohydrate level. As such, in one preferred aspect, the compositions will have a carbohydrate level, on a 250 mL serving basis, of not more than about 15 g, preferably not more than about 8 g, still more preferably not more than about 4 g.

The beverage compositions of the present invention, when in the form of a liquid concentrate or a RTD beverage, comprise water. Ready-to-drink beverages typically contain from about 80% to about 99.8% water. Preferably the water is soft, demineralized, or deionized. Concentrates of the present invention typically contain from about 20% to about 79%, more typically from about 30% to about 70% water. If desired, the water used in the beverage formulation may be carbonated; e.g. sparkling or carbonated water. More typically, a carbonated beverage is produced by solubilizing carbon dioxide gas into the final blended beverage. Usually a beverage will be considered carbonated if it comprises more than 30%, preferably more than 100%, by volume of solubilized carbon dioxide. Carbonated beverages typically comprise from 100% to 450%, preferably from 200% to 350%, carbon dioxide by volume of the beverage.

The beverage compositions of the present invention comprise green tea extract. The extract can be obtained from either a single tea plant or a mixture of plants and it can be in the form of a liquid extract or a dry powdered extract. It is preferred that the green tea extract be light in color and enriched in unoxidized flavanols, i.e., catechin monomers. Preferably, the green tea extract comprises at least about 10% green tea catechins on a dry solids basis, more preferably at least about 20% catechins. Non-limiting examples of suitable green tea extracts include Green Power SynerTea™ brand of green tea extract (commercially available from Amax Nutra-Source, Inc., Eugene, Oreg.), green tea powdered extract #285060 commercially available from Plantextrakt, Inc. (Parsippany, N.J.), and green tea extracts produced by the processes described in U.S. Pat. No. 5,879,733 issued to Ekanayake, et al. (1999) and U.S. Pat. No. 5,427,806 issued to Ekanayake, et al. (1995). Preferred green tea extracts to use when calcium is not included in the beverage formulation are the Green Power SynerTea™ brand of green tea extract and/ or the extract prepared according to the process described in U.S. Pat. No. 5,879,733. A preferred green tea extract when calcium is included in the beverage compositions of the present invention is the extract prepared according to the process described above, in which the extract has been treated to remove insoluble calcium components, such as oxalic acid and pectin. The level of green tea extract in the beverage compositions of the present invention may vary, as long as the beverage comprises at least about 100 ppm of green tea catechins. Typically, the consumable beverages of the present invention will comprise from about 0.03% to about 1% green tea extract solids, more typically from about 0.08% to about 0.5%.

In one aspect of the present invention, the beverage composition preferably comprises food-grade acids to reduce the pH of the beverage. The inventors surprisingly discovered that addition of acid to reduce the pH of the consumable beverage results in a lower absorbance at 430 nm, i.e. the beverage is less brown in color. Non-limiting examples of food-grade acids that can be used to reduce the pH of the beverage include citric, malic, phosphoric, tartaric, ascorbic, and erythorbic acids. Another benefit associated with the addition of food-grade acids to the present beverage composition is improved color stability of the beverage during storage. It is known that the brown color of tea beverages results from oxidation of the catechin monomers to yield high-molecular weight polymers (i.e., theaflavins and thearubigins). Oxidation of the catechins can be controlled and, hence, browning of the green tea beverage delayed or prevented by the addition of acids such as citric, ascorbic, and erythorbic acids. While not wishing to be bound by theory, it is believed that citric acid helps prevent oxidation of the green tea catechins by lowering the beverage pH and by complexing metal ions such as iron and copper, which are known to be oxidation catalysts. It is believed that ascorbic and erythorbic acids help prevent oxidation of the catechins because they are effective reducing agents. The preferred food-grade acids for use in the beverage compositions of the present invention are citric, malic, ascorbic, and/or erythorbic acids.

Other optional ingredients in the beverage compositions of the present invention include carbohydrate sweeteners, zero or low calorie high-intensity or artificial sweeteners, soluble fibers and polysaccharides, proteins and/or peptides, amino acids, emulsifiers, vitamins, salts, natural and/or artificial flavoring agents, flavor enhancers, caffeine, preservatives, and natural and/or artificial coloring agents or other ingredients.

The beverage compositions of the present invention can optionally contain a natural and/or artificial flavoring agent. The particular amount of flavoring agent effective for imparting flavor characteristics to the beverage depends upon the flavor(s) selected, the flavor impression desired and the form of the flavor. The flavoring agent can comprise a fruit juice or vegetable juice, a fruit or vegetable flavor or mixtures thereof. The juice can be provided as juice made from, for example, apple, cranberry, pear, peach, plum, apricot, nectarine, grape, cherry, currant, raspberry, gooseberry, blackberry, blueberry, strawberry, lemon, lime, mandarin, orange, grapefruit, potato, tomato, lettuce, celery, spinach, cabbage, watercress, dandelion, rhubarb, carrot, beet, cucumber, pineapple, coconut, pomegranate, kiwi, mango, papaya, banana, watermelon, tangerine and cantaloupe. Preferred juices are apple, pear, lemon, lime, mandarin, grapefruit, cranberry, orange, strawberry, tangerine, grape, kiwi, pineapple, passion fruit, mango, guava, raspberry and cherry. Citrus juices, such as grapefruit, orange, lemon, lime, mandarin and juices of mango, passion fruit and guava, or mixtures thereof, are most preferred.

The fruit or vegetable juice(s) are present in an amount of from 0% to about 95%, preferably from 0% to about 35%, and more preferably from 0% to about 10% of the beverage. This concentration is based on the single strength of the beverage.

The flavoring agent according to the present invention can also comprise flavors selected from fruit flavors, botanical flavors, vegetable flavors and mixtures thereof. Particularly preferred fruit flavors are the citrus flavors including orange flavors, lemon flavors, lime flavors and grapefruit flavors. Besides citrus flavors, a variety of other fruit flavors can be used such as apple flavors, grape flavors, cherry flavors, pineapple flavors and the like. These fruit flavors can be derived from natural sources such as fruit juices and flavor oils, or else be synthetically prepared. Particularly preferred botanical flavors are hibiscus, marigold and chrysanthemum.

The flavor agent can also comprise a blend of various flavors, e.g., lemon and lime flavors, citrus flavors and selected spices (the typical cola soft drink flavor) etc. If desired the flavor can be formed into emulsion droplets and then dispersed in the beverage drink. Because these droplets usually have a specific gravity less than that of water and would therefore form a separate phase, weighting agents (which can also act as clouding agents) can be used to keep the emulsion droplets dispersed in the beverage. Examples of such weighting agents are sucrose acetate isobutyrate, brominated vegetable oils (BVO) and resin esters, in particular the ester gums. See L. F. Green, *Developments in Soft Drinks Technology Vol.* 1 (Applied Science Publishers Ltd. 1978) pp. 87-93 for a further description of the use of weighting and clouding agents in liquid beverages.

Flavoring agents which are not substantially juice, comprise no more than about 3% of the beverage, preferably such flavor component comprises at least 0.001% by weight of the beverage and typically from about 0.01% to about 3% by weight of the beverage.

The beverage compositions of the present invention can optionally contain preservatives such as benzoic acid, sorbic acid, and salts thereof; salts such as sodium chloride, potassium chloride, sodium phosphate, potassium phosphate, sodium citrate, and potassium citrate; polysaccharides and/or soluble fibers such as guar gum, xanthan gum, alginates, starches, pectin, maltodextrins, gum arabic, arabinogalactan, inulin, fructooligosaccharide, and polydextrose; proteins such as milk proteins (caseins and/or whey proteins) and soy protein; emulsifiers such as mono- and di-glycerides and lecithin; and vitamins such as vitamins C, A, D, E, K, and the B-complex vitamins B1 (thiamine), B2 (riboflavin), B3 (niacin), B6 (pyridoxine), B12 (cyanocobalamin), and folic acid.

The beverage compositions of the present invention are produced by combining the appropriate ingredients using standard beverage manufacturing and processing procedures. For example, see *The Chemistry and Technology of Soft Drinks and Fruit Juices* (P. R. Ashurt, Editor, CRC Press, 1998). In making a single strength beverage, a liquid concentrate or syrup is usually formed first. This liquid concentrate typically contains flavoring agents and/or fruit juice concentrates, acids, salts, high-intensity sweeteners if used, and suitable preservatives if needed. The liquid concentrate usually contains from about 30% to about 70% by weight water. The ingredients are added to the water and mixed in conventional equipment. If desired, the green tea extract can also be incorporated into the liquid concentrate or, alternatively, the green tea extract may be added to the final blended beverage just prior to packaging. After the concentrate is formed, additional carbohydrate sweetener may be added and water is added to make a finished consumable beverage ready for packaging. The product may be cold-filled or hot packed into a suitable container.

C. Analytical Methods

1. Measurement of the Green Tea Catechin Level:

The total level of green tea catechins in consumable beverages or aqueous tea extracts is measured using the following method.

a) Reference:

A. Finger et al., "Chromatography of tea constituents", J. Chromatogr., (1992), 624: 293-315.

b) Scope:

This method is used to measure the level of green tea catechins in consumable beverages.

Five green tea catechins (EC, EGC, EGCG, GCG, and ECG) are measured in the beverage using linear response plots prepared with individual pure standards. This method is also used to measure the level of green tea catechins in aqueous tea extracts after dissolving or diluting the tea extract in water to achieve approximately 0.15% tea solids.

c) Principle:

The consumable beverage is usually diluted 1:10 or 1:100 with diluent (see below) to obtain signals lying within the range of the calibration curve. The diluted sample is filtered through a 0.2 µm filter to remove particulates. The sample is then injected onto a C-18 reversed phase High Performance Liquid Chromatography (HPLC) column. The catechins are eluted using a gradient mobile phase composed of a 0.01 M phosphate buffer at pH 3.1 and acetonitrile. Detection is performed using a UV absorbance detector set to 280 nm.

d) Apparatus:

Class A volumetric flasks (1000 mL, 10 mL, 5 mL)
Sartorius four place balance
Supelco vacuum filtration unit
HP auto sampler vials
Whatman Anotop 25 (0.2 µm) inorganic membrane filter
5 mL disposable syringe

| Instrument Set-up |
|---|
| Agilent-1090 HPLC |
| Agilent 1090 Diode Array Detector set to 280 nm |
| Agilent Chemstation for LC, Rev. A.04.02 |
| YMC basic column 250 mm × 2 mm 5 µm, serial #: 112099G | e) Reagents:

Acetonitrile (HPLC grade, J. T. BAKER, cat# 9011-03, lot N42B26)
Milli-Q water with resistance greater than or equal to 18 MΩ-cm
EDTA (Fisher Scientific, cat#. S311, lot 860954)
Phosphoric acid (J. T. BAKER, cat# 0260-01, lot 25806)
Potassium dihydrogen phosphate (J. T. BAKER, cat# 4008-01, lot 30K0178))
Sodium bisulfite (Sigma, cat#. S9000, lot 30K0178)
Caffeine (CF, Sigma, cat#. C0750, lot 127F-0395)
Epigallocatechin (EGC, Sigma, cat#. E3768, lot 61K1428)
Epicatechin (EC, Sigma, cat#. E1753)
Epigallocatechingallate (EGCG, Sigma, cat#. E4143, lot 61K1773)
Epicatechingallate (ECG, Sigma, cat#. E3893, lot 31K1236)
Gallocatechin gallate (GCG, Sigma, cat#. G6782, lot 110K1413)

f) Solutions:

0.01 M (1.36 g/L) Potassium Dihydrogen Phosphate Buffer:

Weigh 1.36 g potassium dihydrogen phosphate into a 1 liter volumetric flask. Add approximately 600 mL HPLC grade water and stir until solid is dissolved. Titrate with phosphoric acid to a pH of 3.1. Bring to volume with HPLC grade water. Degas using vacuum filtration system.

Diluent:

Use to dilute the sample and ensure stability of the catechins under ambient conditions. Add 0.24 g EDTA and 1.24 g sodium bisulfite ($NaHSO_3$) to 910 mL of 0.01M potassium dihydrogen phosphate buffer. Add 90 mL of acetonitrile.

Preparation of Beverage Sample:

Typically, pipet 0.5 mL of a finished beverage into a 5 mL volumetric flask (1:10 dilution) or 0.1 mL of a finished beverage into a 10 mL volumetric flask (1:100 dilution) and bring to volume with diluent. Filter the resulting solution through a 0.2 µm Whatman filter. Transfer the filtered sample to the auto sampler vial.

Preparation of Standard Solutions:

Each pure standard (caffeine and the five catechins) is accurately weighed and placed into a 5 mL or 10 mL volumetric flask as shown below. Add diluent to dissolve the standard and fill the flask to volume. These are standard stock solutions (~1000 ppm). Standard working solutions are then prepared by diluting the standard stock solutions with diluent. The actual weights and concentrations of the standard stock solutions and working solutions are shown in the following Table.

|  | EGC | CF | EC | EGCG | GCG | ECG |
|---|---|---|---|---|---|---|
| Volume (mL) | 5 | 10 | 10 | 5 | 5 | 5 |
| Actual weights (g) | 0.0043 | 0.0105 | 0.0940 | 0.0049 | 0.0045 | 0.0044 |
| Stock Solution (µg/mL) | 860 | 1050 | 940 | 980 | 900 | 880 |
| Working Solution (µg/mL) | 172 | 420 | 188 | 196 | 180 | 176 |

Using the standard working solutions, response factor mixtures are prepared as shown below:

| | µL of Standard Working Solution | | | | | | |
|---|---|---|---|---|---|---|---|
| Mixture # | EGC | Caffeine | EC | EGCG | ECG | GCG | µL Diluent | Total µL |
| 6 | 600 | 400 | 250 | 100 | 250 | 250 | 3150 | 5000 |
| 7 | 500 | 500 | 20 | 300 | 150 | 20 | 3510 | 5000 |
| 8 | 400 | 25 | 100 | 1200 | 200 | 100 | 2975 | 5000 |
| 9 | 150 | 300 | 200 | 900 | 20 | 200 | 3230 | 5000 |
| 10 | 50 | 100 | 300 | 650 | 300 | 300 | 3150 | 5000 |

The actual concentrations of each standard (caffeine and the 5 catechins) in the response factor mixtures are as follows:

| | Concentration of Standards (µg/mL) | | | | | |
|---|---|---|---|---|---|---|
| Mixture # | EGC | Caffeine | EC | EGCG | ECG | GCG |
| 6 | 20.64 | 33.6 | 9.4 | 3.92 | 8.8 | 9.0 |
| 7 | 17.2 | 42 | 0.75 | 11.76 | 5.28 | 0.72 |
| 8 | 13.76 | 2.1 | 3.76 | 47.04 | 7.04 | 3.6 |
| 9 | 5.16 | 25.2 | 7.52 | 35.28 | 0.704 | 7.2 |
| 10 | 1.72 | 8.4 | 11.28 | 31.36 | 10.56 | 10.8 | g) Chromography Conditions:
Sample size—25 µL
Detector –280 nm AUFS 0.100
Mobile Phase: A=water
B=0.01 M potassium dihydrogen phosphate buffer, pH 3.1
C=Acetonitrile

| Gradient: |
|---|
| 0 min. 1% A + 90% B + 9% C |
| 15 min. 2% A + 80% B + 18% C |
| 18 min. 3% A + 70% B + 27% B |
| 30 min. 1% A + 90% B + 9% C |
| 45 min. stop |

Flow rate: 0.4 mL/min h) Calculation of Catechin Level in the Consumable Beverage:

Peak areas corresponding to each catechin standard on the HPLC chromatogram of the response factor mixtures are used to prepare a linear response plot for each catechin. The correlation coefficients (r-square) for each response plot are typically equal to or greater than 0.99. The beverage sample chromatogram is analyzed for the peak area of each catechin. The level of catechins in the beverage sample is determined from the linear response plots. The level of catechins in the consumable beverage is then calculated by multiplying by the dilution factor used (10× or 100×). The total level of green tea catechins in ppm (µg/mL or mg/L) in the finished beverage is calculated by adding the levels of the five individual catechins measured (EGC+EC+EGCG+ECG+GCG).

2. Measurement of the Turbidity of Consumable Beverages:
A Hach Model 2100AN Turbidimeter (Hach Company, Loveland, Colo.) is used to measure the turbidity of consumable beverages. This instrument measures the turbidity of liquids in Nephelometric Turbidity Units (NTU). The turbidimeter is first calibrated with a set of Gelex® Secondary Turbidity Standards. Measurements are made using the following instrument parameters: ratio on; signal averaging on; automatic range selection; US EPA filter installed. The beverage is equilibrated to room temperature and then poured into a turbidimeter sample cell (sample cell outer diameter=25 mm). The sample cell is inserted into the instrument and the turbidity reading (NTU) is recorded after waiting 30-60 seconds for the reading to stabilize. The measured NTU value is indicative of the level of turbidity of the consumable beverage. Higher NTU values indicate greater turbidity.

3. Measurement of Absorbance at 430 nm of Consumable Beverages:
A UV-Visible spectrophotometer (Unicam UV1 UV-Visible Spectrometer; Unicam Limited, Cambridge, United Kingdom) is used to measure absorbance at 430 nm of consumable beverages. The beverage is equilibrated to room temperature and then poured into a sample cuvette (1 cm path length), which is placed in the sample holder of the spectrophotometer. A blank cuvette filled with deionized water is placed in the blank holder of the spectrophotometer. Absorbance of the beverage sample at a wavelength of 430 nm is measured and recorded (A). The cuvette in the sample holder is then replaced with another blank cuvette filled with deionized water and absorbance of the blank measured at 430 nm and recorded (B). The absorbance of the beverage sample is then adjusted by subtracting the measured absorbance of the deionized water blank:

Absorbance at 430 nm=(A)−(B)

This procedure corrects for any measured absorbance contributed from the water. In theory, absorbance of the deionized water blank (B) will approach zero. The absorbance at 430 nm is indicative of the level of brown color in the beverage.

4. Measurement of pH:

The pH of consumable beverages and aqueous tea extracts is measured with a Corning Model 440 pH Meter. Prior to making pH measurements, the meter is calibrated using pH 4.00 and 7.00 standard buffer solutions (VWR Scientific, West Chester, Pa.).

5. Measurement of the Level of Polyvalent Mineral Cations in Consumable Beverages:

Levels of the minerals calcium, magnesium, manganese, zinc, and iron in consumable beverages are measured by Inductively Coupled Plasma Emission Spectrometry according to the methods described in the following references:

a) "Inductively Coupled Plasma-Atomic Emission Spectrometry Analysis of Biological Materials and Soils for Major, Trace, and Ultra-Trace Elements", *Applied Spectroscopy*, volume 32, pg. 1-29, 1978.

b) AOAC Official Method 985.01, "Metals and Other Elements in Plants and Pet Foods", (3.2.06, Chp. 3, pg. 4).

c) AOAC Official Method 984.27, "Calcium, Copper, Iron, Magnesium, Manganese, Phosphorus, Potassium, Sodium, and Zinc in Infant Formula", (50.1.15, Chp. 50, pg. 15-16).

All AOAC (Association of Official Analytical Chemists) published methods can be found in the following reference:

AOAC International, *Official Methods of Analysis*, P. Cunniff (ed.), $16^{th}$ edition, $5^{th}$ Revision, 1999, Gaithersburg, Md.

The level of each mineral is expressed as mg per 250 mL of beverage. The % RDI of each mineral is calculated by dividing the mineral level by the respective RDI value:

% RDI=[(mg/250 mL beverage)/(RDI)]×100

The RDI values for the minerals are as follows (United States Code of Federal Regulations, Title 21, Section 101.9, *Nutrition Labeling of Food*): calcium=1,000 mg; magnesium=400 mg; manganese=2 mg; zinc=15 mg; iron=18 mg.

6. Measurement of the Caloric Content and Carbohydrate Content of Consumable Beverages:

Caloric content in kilocalories (kcal) per 250 mL of beverage is determined from the carbohydrate, protein, and lipid contents of the beverage. Caloric content is calculated using the general factors of 4, 4, and 9 kcal/g for the content of carbohydrate, protein, and lipid, respectively, per 250 mL serving of beverage (United States Code of Federal Regulations, Title 21, Section 101.9, *Nutrition Labeling of Food*):

Caloric Content(kcal/250 mL beverage)=[(g carbohydrate/250 mL)×4]+[(g protein/250 mL)×4]+[(g lipid/250 mL)×9]

Protein content (g/250 mL beverage) is measured according to the following method (a conversion factor of 6.25 is used to convert % nitrogen to % protein):

AOAC Official Method 968.06, "Protein (Crude) in Animal Feed" (modified), Official Methods of Analysis, Patricia Cunniff (Ed.), $16^{th}$ edition, Vol. 1, AOAC International, Gaithersburg, Md. (1995).

Lipid content (g/250 mL beverage) is measured by acid hydrolysis according to the following method:

AOAC Official Method 954.02, Official Methods of Analysis, $17^{th}$ edition, Vol. 1, AOAC International, Gaithersburg, Md. (2000).

Ash content (g/250 mL beverage) is measured according to the following method:

AOAC Official Method 923.03, "Ash of Flour" (modified), Official Methods of Analysis, Patricia Cunniff (Ed.), 16th edition, Vol. 2, AOAC International, Gaithersburg, Md. (1995).

Moisture content (g/250 mL beverage) is measured according to the following method:

AOAC Official Method 934.06, "Moisture in Dried Fruits" (modified), Official Methods of Analysis, Patricia Cunniff (Ed.), $16^{th}$ edition, Vol. 2, AOAC International, Gaithersburg, Md. (1995).

Carbohydrate content is calculated by difference using the following equation:

Carbohydrate Content(g/250 mL beverage)=100−(Protein Content)−(Lipid Content)−(Ash Content)−(Moisture Content)

7. Measurement of the Moisture Content of Dry Beverage Compositions:

Moisture content of dry beverage compositions is measured according to the following method:

AOAC Official Method 979.12, "Moisture (Loss on Drying) in Roasted Coffee", Official Methods of Analysis, Patricia Cunniff (Ed.), $16^{th}$ edition, $5^{th}$ revision, AOAC International, Gaithersburg, Md. (1999).

8. Measurement of the Oxalic Acid Level:

This method is used to measure the level of oxalic acid in consumable beverages and aqueous tea extracts.

a) Reference:

Official Methods of Analysis of AOAC INTERNATIONAL (2000) $17^{th}$ Ed. AOAC INTERNATIONAL, Gaithersburg, Md., USA, Official Method 986.13. (modified)

b) Scope:

This method is used to measure the level of oxalic acid, fumaric acid, tartaric acid, citric acid, malic acid, lactic acid, succinic acid, and acetic acid in food products.

c) Principle:

The sample is filtered to remove interferences. Organic acids are then separated using HPLC utilizing UV detection at 214 nm.

d) Apparatus:
   Class A volumetric flasks (1000 mL, 10 mL, 5 mL)
   Sartorius four place balance
   Liquid Chromatograph—System equipped with Model 7725i inhector, Model 2487 variable wavelength detector operable at 214 nm, 0.1 AUFS (Waters Associates, Inc.) and computing integrator (Hewlett-Packard Integrator 3390 [replaced by No. 3396B], or equivalent).
   Analytcal Columns—(1) Supelcosil LC-18, or equivalent, 5 µm particle size, 25 cm×4.6 mm, in tandem with and followed by (2) Radial-Pak C18 cartridge (Water Associate, Inc.), 5 µm particle size, 10 cm long, used with Radial Compression Module. Radial-Pak C18 cartridge can be substituted by any standard 25 or 30 cm stainless steel reverse phase C18 column with 10 µm particle size. Connect Bio-Rad reverse phase micro-guard column (ODS-10) ahead of column 1. Mobile phase: phosphate buffer at 0.8 mL/min; sensitivity 0.1 AUFS.

e) Disposable cartridges:—Sep-Pak C18 (Water Associates, Inc.)
   0.45 µm inorganic membrane filter f) Reagents:
   Potassium phosphate monobasic ($KH_2PO_4$)
   85% Phosphoric acid
   Methanol
   $CH_3CN$
   Malic acid Standard ACS grade
   Citric acid Standard ACS grade
   Oxalic acid Standard ACS grade
   Quinic acid Standard ACS grade g) LC mobile phase:
   0.2 M Phosphate Buffer. pH 2.4:—
   Weigh 27.2 g potassium dihydrogen phosphate in beaker. Add water to 950 mL. Using pH meter and 85% phosphoric acid, adjust to pH 2.4. Pour into 1 L graduate and adjust to volume with water; filter.
   Preparation of Test Samples and Standards
   (a) Working standard solutions.—Weigh 0.200 g each of ACS grade quinic, malic, citric, and oxalic acids to the nearest 0.1 mg. Dissolve in water, make up the volume to 100 mL in a volumetric flask with water and filter.
   (b) Test sample solutions.—Cartridge is conditioned by eluting 10 mL $CH_3CN$-$H_2$0 (50+50) through 10 mL Luer-Lok syringe. The syringe is removed and 10 mL air is passed through the cartridge. Ten mL of sample is eluted through the conditioned cartridge. First 4-5 mL is discarded and the next 4-5 mL is collected and filtered for LC analysis.
   Determination:
   The system is conditioned with 100% methanol (or methanol-$H_2O$[70+30]) followed by water and then phosphate buffer. The order is reversed at end of working day; never letting methyl alcohol to come in contact with phosphate buffer. Operating conditions:—flow rate 0.80 mL/min; 214 nm detector; temperature ambient; sensitivity 0.1 AUFS. Column system is satisfactory when baseline separation is achieved between sugar front peak and quinic acid in aqueous green tea extract. 5-20 µL standard solution is injected after each 2 test sample injections to check linearity. 5 µL test sample solution is injected. An average of 2 injections are recorded for standard and test sample responses.

h) Calculations of Oxalic acid $$\% \text{ Oxalic acid} = (PA/PA') \times (V'/V) \times C$$

where PA and PA'=peak area of test sample and standard, respectively; V and V'=volume of test sample and standard, respectively; and C=concentration of standard, %.

9. Measurement of the Total Insoluble Calcium Components:
   This method is used to measure the level of total insoluble calcium components in consumable beverages or aqueous tea extracts. Weigh 1000 g of the consumable beverage or 100 g of a 5% w/w aqueous solution of green tea extract in a 2000 mL beaker. Add 20 mL of a 10% calcium chloride solution. Allow to stand for 1 hour and then heat to 80° C. and hold for 30 minutes. Filter through a tared filter paper. Wash the gelatinous precipitate with boiling water. Then dry and weigh the precipitate as total insoluble calcium components.

D. EXAMPLES

Example 1

A green tea fortified water beverage of the present invention is prepared according to the following formulation.

| Ingredient | Wt. % | g/L |
|---|---|---|
| Deionized Water | 96.582 | 989.1 |
| Magnesium Sulfate, anhydrous (Tangram Co.; Holtsville, NY)[1] | 0.086 | 0.88 |
| Vitamin Premix (Roche Vitamins, Inc.; Parsippany, New Jersey)[2] | 0.029 | 0.30 |
| Sucrose, granulated (The Amalgamated Sugar Co.; Ogden, Utah) | 2.682 | 27.47 |
| Acesulfame Potassium (Nutrinova, Inc.; Somerset, New Jersey) | 0.013 | 0.13 |
| Sodium Citrate, dihydrate (A. E. Staley; Decatur, Illinois) | 0.155 | 1.59 |
| Mono-potassium Phosphate (Astaris LLC; Carteret, New Jersey) | 0.086 | 0.88 |
| Green Tea Extract Powder (SynerTea ™; Amax NutraSource, Inc.; Eugene, Oregon) | 0.147 | 1.50 |
| Citric Acid, anhydrous (A. E. Staley; Decatur, Illinois) | 0.220 | 2.25 |
| TOTAL = | 100.0 | 1,024.1 |

[1]Magnesium sulfate is 20.2% Mg
[2]The vitamin premix provides the following nutrients per 250 mL serving of beverage:
Vitamin C 22.2 mg
Vitamin B12 0.79 µg
Niacin 2.6 mg
Vitamin E 3.96 International Units
Vitamin B6 0.26 mg
Zinc 1.74 mg The source of zinc in the vitamin premix is zinc gluconate (13.4% Zn).

The dry ingredients are weighed out and added to the deionized water with agitation. Mixing is continued until all the ingredients are in solution. The final beverage is clear with minimal brown color and no turbidity. The beverage has the following attributes:

| | |
|---|---|
| Green Tea Catechin Level (ppm = mg/L) | 400 ppm |
| Turbidity | 22.3 NTU |
| Absorbance at 430 nm | 0.043 |

| -continued | |
|---|---|
| (average of 2 measurements) | |
| pH | 3.61 |
| Mineral Levels (per 250 mL beverage): | |
| Magnesium | 44 mg = 11.0% RDI |
| Zinc | 1.7 mg = 11.3% RDI |
| Carbohydrate Content (per 250 mL beverage) | 7 g |
| Calorie Content (per 250 mL beverage) | 28 kcal |

The beverage is packaged in green colored plastic bottles. The in-package appearance is virtually identical to pure water.

Example 2

Two water beverage formulations fortified with green tea extract are prepared according to the following formulations:

| Formula A | | |
|---|---|---|
| Ingredient | Wt. % | Grams/ Liter |
| Deionized Water | 97.113 | 994.53 |
| Magnesium Sulfate, anhydrous (Tangram Co.; Holtsville, NY)[1] | 0.086 | 0.88 |
| Zinc Gluconate (Glucona America, Inc.; Janesville, Wisconsin)[2] | 0.009 | 0.09 |
| Sucrose, granulated (The Amalgamated Sugar Co.; Ogden, Utah) | 2.682 | 27.47 |
| Acesulfame Potassium (Nutrinova, Inc.; Somerset, New Jersey) | 0.013 | 0.13 |
| Green Tea Extract Powder (Product #285060; Plantextrakt, Inc., Parsippany, New Jersey) | 0.098 | 1.00 |
| TOTAL = | 100.0 | 1,024.1 |

| Formula B | | |
|---|---|---|
| Ingredient | Wt. % | Grams/ Liter |
| Deionized Water | 96.652 | 989.81 |
| Magnesium Sulfate, anhydrous (Tangram Co.; Holtsville, NY)[1] | 0.086 | 0.88 |
| Zinc Gluconate (Glucona America, Inc.; Janesville, Wisconsin)[2] | 0.009 | 0.09 |
| Sucrose, granulated (The Amalgamated Sugar Co.; Ogden, Utah) | 2.682 | 27.47 |
| Acesulfame Potassium (Nutrinova, Inc.; Somerset, New Jersey) | 0.013 | 0.13 |
| Sodium Citrate, dihydrate (A. E. Staley; Decatur, Illinois) | 0.155 | 1.59 |
| Mono-potassium Phosphate (Astaris LLC; Carteret, New Jersey) | 0.086 | 0.88 |
| Green Tea Extract Powder (Product #285060; Plantextrakt, Inc., Parsippany, New Jersey) | 0.098 | 1.00 |
| Citric Acid, anhydrous (A. E. Staley; Decatur, Illinois) | 0.220 | 2.25 |
| TOTAL = | 100.0 | 1,024.1 |

[1]Magnesium sulfate is 20.2% Mg
[2]Zinc gluconate is 13.4% Zn

Each beverage is prepared by weighing out the appropriate amount of dry ingredients and adding the dry ingredients to the deionized water with agitation. Mixing is continued until all the ingredients are in solution. The final beverages have the following attributes:

| | Formula A | Formula B |
|---|---|---|
| Green Tea Catechin Level (ppm = mg/L) | 150 ppm | 150 ppm |
| Turbidity | 15.3 NTU | 4.1 NTU |
| Absorbance at 430 nm (average of 2 measurements) | 0.302 | 0.129 |
| pH | 5.22 | 3.60 |
| Mineral Levels (per 250 mL): | | |
| Magnesium | 44 mg = 11.0% RDI | 44 mg = 11.0% RDI |
| Zinc | 3.0 mg = 20% RDI | 3.0 mg = 20% RDI |

Formula B has a lower pH and yields a final beverage with a significantly lower absorbance at 430 nm and less visually apparent brown color, relative to formula A.

Example 3

A fortified sports drink of the present invention is prepared according to the following formulation.

| Ingredient | Wt. % | Grams/ Liter |
|---|---|---|
| Deionized Water | 93.279 | 955.27 |
| Magnesium Sulfate, anhydrous (Tangram Co.; Holtsville, NY)[1] | 0.154 | 1.58 |
| Zinc Gluconate (Glucona America, Inc.; Janesville, Wisconsin)[2] | 0.009 | 0.09 |
| Ferrous bis-glycinate (Ferrochel ®, Albion Laboratories, Inc., Clearfield, Utah)[3] | 0.004 | 0.04 |
| Maltodextrin, 15 DE (Maltrin M150, Grain Processing Corp., Muscatine, Iowa) | 3.095 | 31.70 |
| Sucrose, granulated (The Amalgamated Sugar Co.; Ogden, Utah) | 2.682 | 27.47 |
| Acesulfame Potassium (Nutrinova, Inc.; Somerset, New Jersey) | 0.013 | 0.13 |
| Sodium Citrate, dihydrate (A. E. Staley; Decatur, Illinois) | 0.155 | 1.59 |
| Sodium Chloride (IMC Salt, Inc.; Overland Park, Kansas) | 0.033 | 0.34 |
| Mono-potassium Phosphate (Astaris LLC; Carteret, New Jersey) | 0.086 | 0.88 |
| Green Tea Extract Powder (SynerTea ™; Amax NutraSource, Inc.; Eugene, Oregon) | 0.110 | 1.13 |
| Citric Acid, anhydrous (A. E. Staley; Decatur, Illinois) | 0.244 | 2.50 |
| FD&C Red No. 40 powder (B. F. Goodrich, Cleveland, Ohio) | 0.005 | 0.05 |
| Natural Flavor (Mane, Inc., Milford, Ohio) | 0.130 | 1.33 |
| TOTAL = | 100.0 | 1,024.1 |

[1]Magnesium sulfate is 20.2% Mg
[2]Zinc gluconate is 13.4% Zn
[3]Ferrous bis-glycinate (Ferrochel ®) is 20.2% Fe The dry ingredients are weighed out and added to the deionized water with agitation. Mixing is continued until all the ingredients are in solution. The natural flavor is then added with agitation. The finished drink has the following attributes.

| | |
|---|---|
| Green Tea Catechin Level (ppm = mg/L) | 300 ppm |
| Turbidity | 4.1 NTU |
| pH | 3.47 |
| Mineral Levels (per 250 mL): | |
| Magnesium | 80 mg = 20% RDI |
| Zinc | 3.0 mg = 20% RDI |
| Iron | 2.0 mg = 11% RDI |
| Carbohydrate Content (per 250 mL beverage) | 15.0 g |
| Calorie Content (per 250 mL beverage) | 60 kcal |

Example 4

A calcium compatible nano-filtered green tea extract is prepared as follows. To 100 g of a 5% w/w solution of SynerTea™ green tea extract in water, 0.22 g of calcium sulfate dihydrate is added and stirred for 15 minutes. The treated extract is heated to 168° F. (75.6° C.) and held for 10 minutes. The extract is then cooled and filtered through a 0.45 micron filter. The filtered extract thus obtained is free of insoluble calcium components, such as oxalic acid, and does not yield sedimentation on standing.

| | Before Treatment | After Treatment |
|---|---|---|
| Green Tea Extract Solution pH | 5.24 | 5.03 |
| Green Tea Catechin Level (g per 100 g on dry weight basis) | 2.56 | 2.50 |
| Insoluble Calcium Components (g per 100 g on dry weight basis) | 3.16 | N.D. |
| Oxalic Acid Content (g per 100 g on dry weight basis) | 2.62 | <0.1 |

N.D. = not detected

Example 5

A calcium compatible green tea extract is prepared as follows. To 100 g of a 5% w/w solution of Plantextrakt (#285060) Green Tea extract in water, 1.6 g of calcium chloride dihydrate is added and stirred for 15 minutes. The treated extract is heated to 168° F. (75.6° C.) and held for 10 minutes. The extract is then cooled and filtered through Whatman paper #1 and then through a 0.45 micron filter. The filtered extract thus obtained is free of insoluble calcium components, such as oxalic acid and pectin, and does not yield sedimentation on standing.

| | Before Treatment | After Treatment |
|---|---|---|
| Green Tea Extract Solution pH | 5.70 | 5.08 |
| Green Tea Catechin Level (g per 100 g on dry weight basis) | 1.50 | 1.60 |
| Insoluble Calcium Components (g per 100 g on dry weight basis) | 4.94 | N.D. |
| Oxalic Acid Content (g per 100 g on dry weight basis) | 2.62 | <0.1 |

N.D. = not detected

Example 6

A water beverage fortified with calcium and green tea extract is prepared according to the following formulation. Prior to addition, an aqueous solution of the Plantextrakt green tea extract (5% w/w) is treated to remove calcium insoluble components, such as oxalic acid and pectin, using the procedure described in Example 5 above.

| Ingredient | Wt. % | Grams/Liter |
|---|---|---|
| Deionized Water | 93.309 | 955.58 |
| Magnesium Sulfate, anhydrous (Tangram Co.; Holtsville, NY)[1] | 0.086 | 0.88 |
| Vitamin Premix (Roche Vitamins, Inc.; Parsippany, New Jersey)[2] | 0.029 | 0.30 |
| Sucrose, granulated (The Amalgamated Sugar Co.; Ogden, Utah) | 2.682 | 27.47 |
| Acesulfame Potassium (Nutrinova, Inc.; Somerset, New Jersey) | 0.013 | 0.13 |
| Sodium Citrate, dihydrate (A. E. Staley; Decatur, Illinois) | 0.155 | 1.59 |
| Mono-potassium Phosphate (Astaris LLC; Carteret, New Jersey) | 0.086 | 0.88 |
| Treated Green Tea Extract aqueous solution from Example 5 | 2.94 | 30.11 |
| Citric Acid, anhydrous (A. E. Staley; Decatur, Illinois) | 0.220 | 2.25 |
| Calcium gluconate (Glucona America, Inc.; Janesville, Wisconsin)[3] | 0.480 | 4.92 |
| TOTAL = | 100.0 | 1,024.1 |

[1] Magnesium sulfate is 20.2% Mg
[2] The vitamin premix provides the following nutrients per 250 mL serving of finished beverage:
Vitamin C 22.2 mg
Vitamin B12 0.79 μg
Niacin 2.6 mg
Vitamin E 3.96 International Units
Vitamin B6 0.26 mg
Zinc 1.74 mg
The source of zinc in the vitamin premix is zinc gluconate (13.4% Zn).
[3] Calcium gluconate is 9.31% Ca The dry ingredients are weighed out and added to the deionized water with agitation. The treated green tea extract solution from Example 5 is then added and mixing is continued until all the ingredients are in solution. The final beverage is clear with no turbidity. The beverage has the following attributes:

| | |
|---|---|
| Green Tea Catechin Level (ppm = mg/L) | 227 ppm |
| Turbidity | 30 NTU |
| pH | 3.63 |
| Mineral Levels (per 250 mL beverage): | |
| Magnesium | 44 mg = 11.0% RDI |
| Zinc | 1.7 mg = 11.3% RDI |
| Calcium | 115 mg = 11.5% RDI |
| Carbohydrate Content (per 250 mL beverage) | 7 g |
| Calorie Content (per 250 mL beverage) | 28 kcal |

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

All documents cited in the Detailed Description of the Invention section are, in relevant part, incorporated herein by reference; the citation of any document is not to be construed as an admission that it is prior art with respect to the present invention.

What is claimed is:

1. A ready-to-drink beverage composition comprising (1) at least about 100 ppm green tea catechins, and (2) at least about 10% of the RDI of one or more polyvalent mineral cations per 250 mL of the composition; wherein the beverage composition exhibits a turbidity of not more than about 100 Nephelometric Turbidity Units (NTU).

2. The composition of claim 1 comprising at least about 200 ppm green tea catechins.

3. The composition of claim 1 comprising from about 100 to about 3000 ppm green tea catechins.

4. The composition of claim 1 that exhibits a turbidity of not more than about 50 NTU.

5. The composition of claim 1 that exhibits a turbidity of from about 1 to about 100 NTU.

6. The composition of claim 1 wherein the composition comprises at least about 20% of the RDI of one or more polyvalent mineral cations.

7. The composition of claim 1 wherein the polyvalent mineral cation is selected from the group consisting of calcium, magnesium, manganese, zinc, iron and mixtures thereof.

8. The composition of claim 7 wherein the composition comprises at least about 10% of the RDI of calcium and a green tea extract comprising not more than about 1000 ppm total insoluble calcium components.

9. The composition of claim 1 wherein the polyvalent mineral cation is selected from the group consisting of magnesium, manganese, zinc, iron and mixtures thereof and the composition is essentially free of calcium.

10. The composition of claim 1 wherein the composition exhibits an absorbance at 430 nm of not more than about 0.15.

11. The composition of claim 1 having a pH of from about 2 to about 5.

12. A dry composition or a concentrated liquid composition which, when reconstituted or diluted with an aqueous liquid to provide a consumable beverage, (a) comprises at least about 100 ppm green tea catechins, (b) comprises at least about 10% of the RDI on 250 mL serving basis, of one or more polyvalent mineral cations, and (c) exhibits a turbidity of not more than about 100 Nephelometric Turbidity Units (NTU).

13. The composition of claim 12 comprising, upon reconstitution or dilution to provide a consumable beverage, from about 100 to about 3000 ppm green tea catechins.

14. The composition of claim 12 that, upon reconstitution or dilution to provide a consumable beverage, exhibits a turbidity of from about 1 to about 100 NTU.

15. The composition of claim 12 wherein the composition, upon reconstitution or dilution to provide a consumable beverage, comprises at least about 20% of the RDI of one or more polyvalent mineral cations.

16. The composition of claim 12 wherein the polyvalent cation is selected from the group consisting of calcium, magnesium, manganese, zinc, iron and mixtures thereof.

17. The composition of claim 16 wherein the composition comprises, upon reconstitution or dilution to provide a consumable beverage, at least about 10% of the RDI of calcium and a green tea extract comprising not more than about 1000 ppm total insoluble calcium component.

18. The composition of claim 12 wherein the polyvalent cation is selected from the group consisting of magnesium, manganese, zinc, iron and mixtures thereof and the composition is essentially free from calcium.

19. The composition of claim 12 wherein the composition, upon reconstitution or dilution to provide a consumable beverage, exhibits an absorbance at 430 nm of not more than about 0.15.

20. The composition of claim 12 having, upon reconstitution or dilution to provide a consumable beverage, a pH of from about 2 to about 5.

* * * * *

UNITED STATES PATENT AND TRADEMARK OFFICE
CERTIFICATE OF CORRECTION

PATENT NO. : 7,419,693 B2  
APPLICATION NO. : 10/883446  
DATED : September 2, 2008  
INVENTOR(S) : Jeffrey John Kester et al.

Page 1 of 1

It is certified that error appears in the above-identified patent and that said Letters Patent is hereby corrected as shown below:

Column 20

Line 54, delete "44 mg = 11.0% RDI".

Line 55, after Magnesium, insert -- 44 mg = 11.0% RDI --.

Signed and Sealed this

Twenty-sixth Day of May, 2009

JOHN DOLL  
*Acting Director of the United States Patent and Trademark Office*